(12) United States Patent  
Su et al.

(10) Patent No.: US 7,610,278 B2  
(45) Date of Patent: Oct. 27, 2009

(54) ELECTRONIC BUSINESS INFORMATION SYSTEM

(75) Inventors: Barry R. Su, La Puente, CA (US); Ruiyi Ma, Diamond Bar, CA (US); Grace Su, La Puente, CA (US)

(73) Assignee: Tyloon, Inc., La Puente, CA (US)

( * ) Notice: Subject to any disclaimer, the term of this patent is extended or adjusted under 35 U.S.C. 154(b) by 210 days.

(21) Appl. No.: 11/304,361

(22) Filed: Dec. 14, 2005

(65) Prior Publication Data

US 2007/0136266 A1 Jun. 14, 2007

(51) Int. Cl.  
*G06F 17/30* (2006.01)

(52) U.S. Cl. .................................. 707/4; 707/3; 707/5

(58) Field of Classification Search .............. None  
See application file for complete search history.

(56) References Cited

U.S. PATENT DOCUMENTS

2003/0236776 A1* 12/2003 Nishimura et al. ............. 707/3  
2004/0034521 A1* 2/2004 Kawakura et al. ............. 704/1

* cited by examiner

*Primary Examiner*—John E Breene  
*Assistant Examiner*—Thu-Nguyet Le  
(74) *Attorney, Agent, or Firm*—Raymond Y. Chan; David and Raymond Patent Firm

(57) ABSTRACT

An electronic business information system includes an information center and a search platform. The information center is adapted for a user to access through a public communication network, and includes an information database storing a plurality of business profiles each having an interface subject. The interface subjects of the business profiles are selectively interchangeable when the business profiles are correlated with each other. The search platform communicatively links with the information center for the user to search through the information database, wherein when a search request is sent to the information center through the public communication network, the information center selectively sorts out the business profiles matching with the search request to generate a search result.

34 Claims, 9 Drawing Sheets

Search results comparison

| Commercial entity A (by business entity A) | commercial entity B (by business entity B) | Commercial entity C (by business entity C) | |
|---|---|---|---|
| *Commercial attribute #1 (121)* | *Commercial attribute #1 (121)* | *Commercial attribute #1 (121)* | ...... |
| *Commercial attribute #2* | *Commercial attribute #2* | *Commercial attribute #2* | . . |

Traditional International Business Information System:

Integrated and Uniformed Multilingual International Business Information System:

ELECTRONIC BUSINESS INFORMATION SYSTEM

BACKGROUND OF THE PRESENT INVENTION

1. Field of Invention

The present invention relates to an information system, and more particularly to an electronic business information system and a method thereof for searching business information, wherein the search result is generated from uniformly designed template structures and in a predetermined interface language so as to optimize a search application of a particular user.

2. Description of Related Arts

With the advance of information technology, searching information through Internet has become part of their daily life for many people. A typical search process usually involves the submission of a search request to a search server which is linked to a particular search database, a matching of the search request with the relevant information in that search database, and production of a search result by the search server, wherein the search result is transmitted from the search server to the user's terminal and displayed by a displaying device, such as a monitor.

For search engines such as "YAHOO" or "GOOGLE", when one conducts a search for a subject by keyword(s), a great list of websites that contain such keyword(s) will be sited and listed for logging in. However, in business purposes, the searchers generally just need to search for kinds of product or companies which provide the required services or products. These common search engines fail to provide such immediately results to the searchers all over the world. In other words, for conventional search engines, when one is trying to search a particular item, the search results may be totally out of context because the conventional search engines will search for the particular item wherever that particular item appears in the web or in the relevant yellow pages. For example, when the user is searching "bicycle" with the aim of comparing prices and sales locations, the search results may consist of a technical website describing the working principles of bicycles. This kind of search results will be of little use by the user.

Electronic yellow pages search engines such as "YELLOWPAGES.COM" or "YELLOW.COM" provide domestic search for entities within a district or a country. However, due to the convenience of worldwide transportation and the World Wide Web, there is no more domestic business and, in fact, most of the product or service providers are international entities who are capable to sell products or provide services to anyone all the world or even have national branch companies or offices in different countries. For example, the "WAL-MART" has thousands of stores all over different states of the United States and different cities of different countries. It may provide different products and stocks in different stores. Similarly, a consumer or buyer of a product or a service that meets his or her requirement would not mind where this product or service comes from whatever country or district.

With its unprecedented growth over the few ten years, the internet has finally made us a real global village but language remains an important issue. Language barriers prevent people from understanding all of the online information they seek. There is no real international search engine or web site that can provide information of searching product or service providers in different countries with different languages support for different searchers of different countries. For example, an American searcher may merely find product or service providers listed in English language and located in the United States. If the searcher wants to search for product or service providers in other countries or in other languages, he or she must log out the original web site and then log in another web site with the same search engine or using another search engine to do so. In other words, the searcher cannot compare searched information of the products, services, and/or the product or service providers with that of the other countries in different languages.

In addition, the search engines will generally confine the scope of a particular search to a particular locality and the search results thereby produced are the consequences of largely truncated search processes. For example, when one is searching a book entitled "Harry Potter" using an American based search engine, the search result may consist of a plurality of Americans bookstores which sell that particular book. However, when the user is comparing the price of that book at various different bookstores (which may not necessarily be in America), he may not be able to get a comprehensive search results. An obvious example is that if there is a United Kingdom online bookstore which sells "Harry Potter" at a discounted price, the user will not get this piece of information because the search process may be truncated to discard United Kingdom's bookstores.

Moreover, as a matter of fact, the majority of websites posted on Internet are written in English. This is partly because English, being a recognized international language, is widely accepted all over the world. Conventional search engines, such as "YAHOO" and "GOOGLE", are usually user-friendly and interactive so that they present little problems for daily applications.

Difficult problems arise however, when one is trying to search a local website using an English-based search engine, or indeed search engines in any other language different that of the local website. For example, using an English version yahoo to search for a Chinese or a French local website (which do not written in English) is very inconvenient. In order to resolve such difficulty, some search engines incorporates translation function whereby websites in a particular local language is translated by a predetermined dictionary so that the local websites (after translation) are matched and sorted alongside with the language of the search request so as to broaden the scope of the corresponding search result.

An associated difficulty in this area is that no one can guarantee the quality of the translation so that the search result may turn out to contain a vast number of unrelated websites. The situation will be even worse when the search request is inaccurately translated. At the end of the day, it may be that the search result contains web data which is completely irrelevant.

SUMMARY OF THE PRESENT INVENTION

A main object of the present invention is to provide an electronic business information system and a method thereof for searching international business information regarding the business entities and/or the products and/or services produced by entities in different localities in one or more countries for each search. It is especially convenience to business searchers who would only interest in searching for one or more specific products or services with required prices and qualities provided by any entities in any countries or who would like to search for a target entity anywhere for its product, service or detail information.

Another object of the present invention is to provide an electronic business information system and a method thereof for search international business information, wherein it is a multilingual system and method that the search result for each search, such as index search or keyword search, and the displaying information of the products, services and/or entities can be selectively displayed in designated language or switched among two or more different languages anytime while conducting the search or reviewing the search results.

Another object of the present invention is to provide an electronic business information system and a method thereof for searching business information, wherein the search result is generated from uniformly designed template structures and in a predetermined interface language so as to optimize a search application of a particular user.

Another object of the present invention is to provide an electronic business information system and a method thereof which is adapted to produce search results displayed in an interface language corresponding to the search request language, wherein the user will be given an option to interchange the interface language by interchanging the corresponding business profiles.

Another object of the present invention is to provide an electronic business information system and a method thereof which is a search engine adapted to produce search results consisting only of business entities for the sales of the subject matter of the search request, so as to assist the user in making purchasing decisions for that subject matter and minimize redundant search results.

Another object of the present invention is to provide an electronic business information system and a method thereof which is user-friendly and easy to use so as to facilitate widespread popularity of the present invention.

Another object of the present invention is to provide an electronic business information system and a method thereof, which enable people to search and understand the same business information in their own languages.

Another object of the present invention is to provide an electronic business information system and a method thereof, which allow users, using keywords in any of these languages, English, Spanish, simplified Chinese and traditional Chinese, or mixed keywords of those languages, to search the business database that could be explored only in English before.

Another object of the present invention is to provide an electronic business information system and a method thereof, which is easy not only to browse and/or search listed business information in one's own language, but also to freely change the current viewing page to a different language, or change it back anywhere on this site without going to the Home Page of a language.

Accordingly, in order to accomplish the above objects, the present invention provides an electronic business information system, comprising:

an information center, which is adapted for a user to access through a public communication network, comprising an information database storing a plurality of business profiles each having an interface subject, wherein the interface subjects of the business profiles are selectively interchangeable while the business profiles are correlated with each other and are characterized by two or more different interface subjects; and a search platform communicatively linking with the information center for the user to search through the information database, wherein when the information center receives a search request through the public communication network, the information center selectively sorts out the business profiles matching with the search request to generate a search result including the business profiles each containing a business entity displayed in the respective interface subject, such that the business profiles in the search result is adapted to be selectively interchanged the interface subjects of the business profiles.

Moreover, the present invention also provides a method of searching business information, comprising the steps of:

(a) providing an information center for a user to access through a public communication network, wherein the information center comprises an information database storing a plurality of business profiles, wherein each of the business profiles has an interface subject, wherein when the business profiles are correlated with each other, the interface subjects of the business profiles are selectively interchangeable;

(b) receiving a search request through the public communication network;

(c) sorting out the business profiles with the interface subject to match with the search request; and (d) generating a search result containing the business profiles with the interface subject of the search request, wherein the business profiles in the search result is adapted to be selectively interchanged the interface subjects by interchanging the corresponding business profiles.

These and other objectives, features, and advantages of the present invention will become apparent from the following detailed description, the accompanying drawings, and the appended claims.

BRIEF DESCRIPTION OF THE DRAWINGS

FIG. 3 is a schematic diagram of the search results according to the above preferred embodiment of the present invention, illustrating that the search user may compare the subject matter of the search among different business entities.

DETAILED DESCRIPTION OF THE PREFERRED EMBODIMENT

Figure 1:
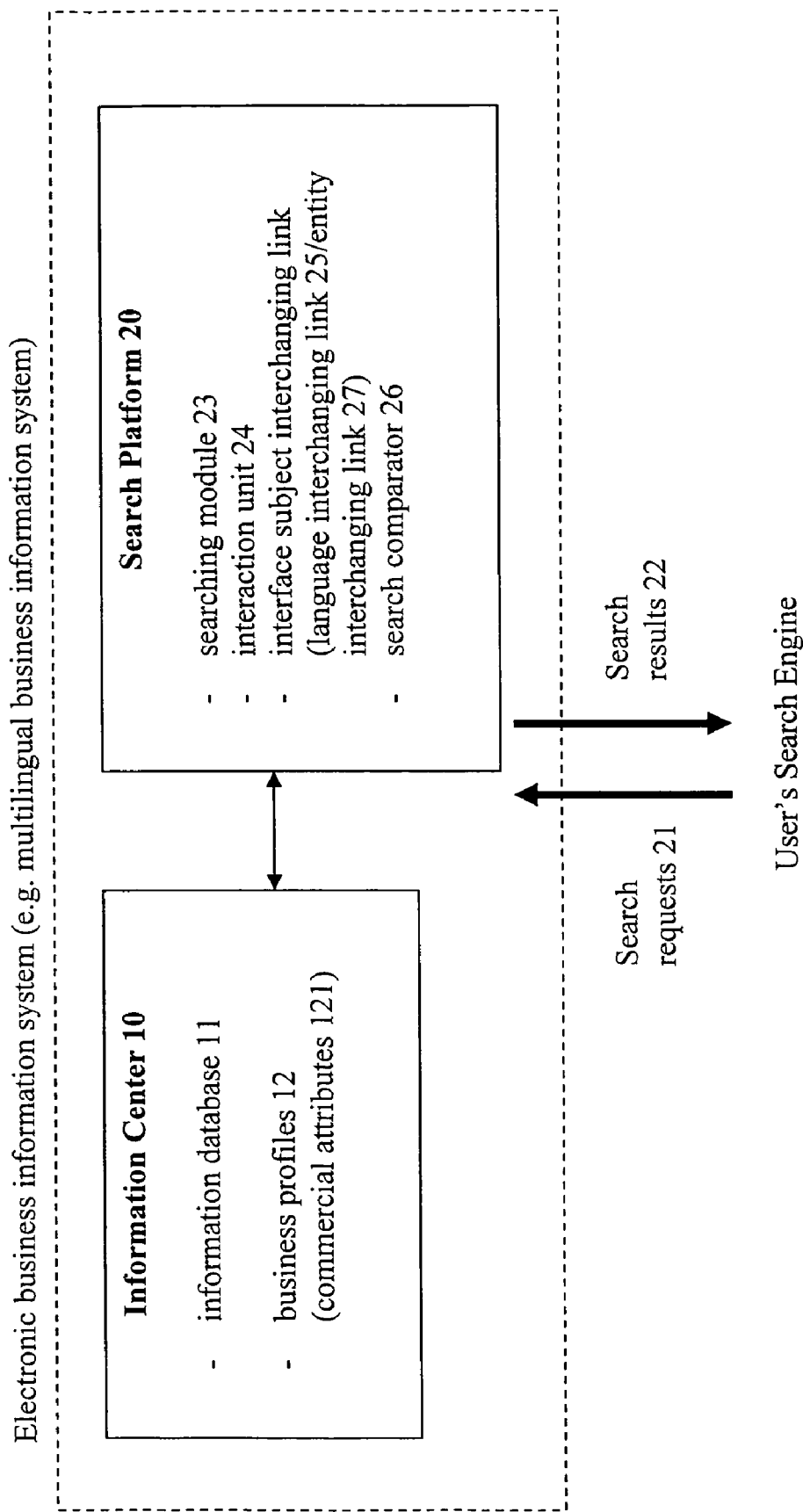
FIG. 1 is a schematic diagram of an electronic business information system according to a preferred embodiment of the present invention.
Figure 2:
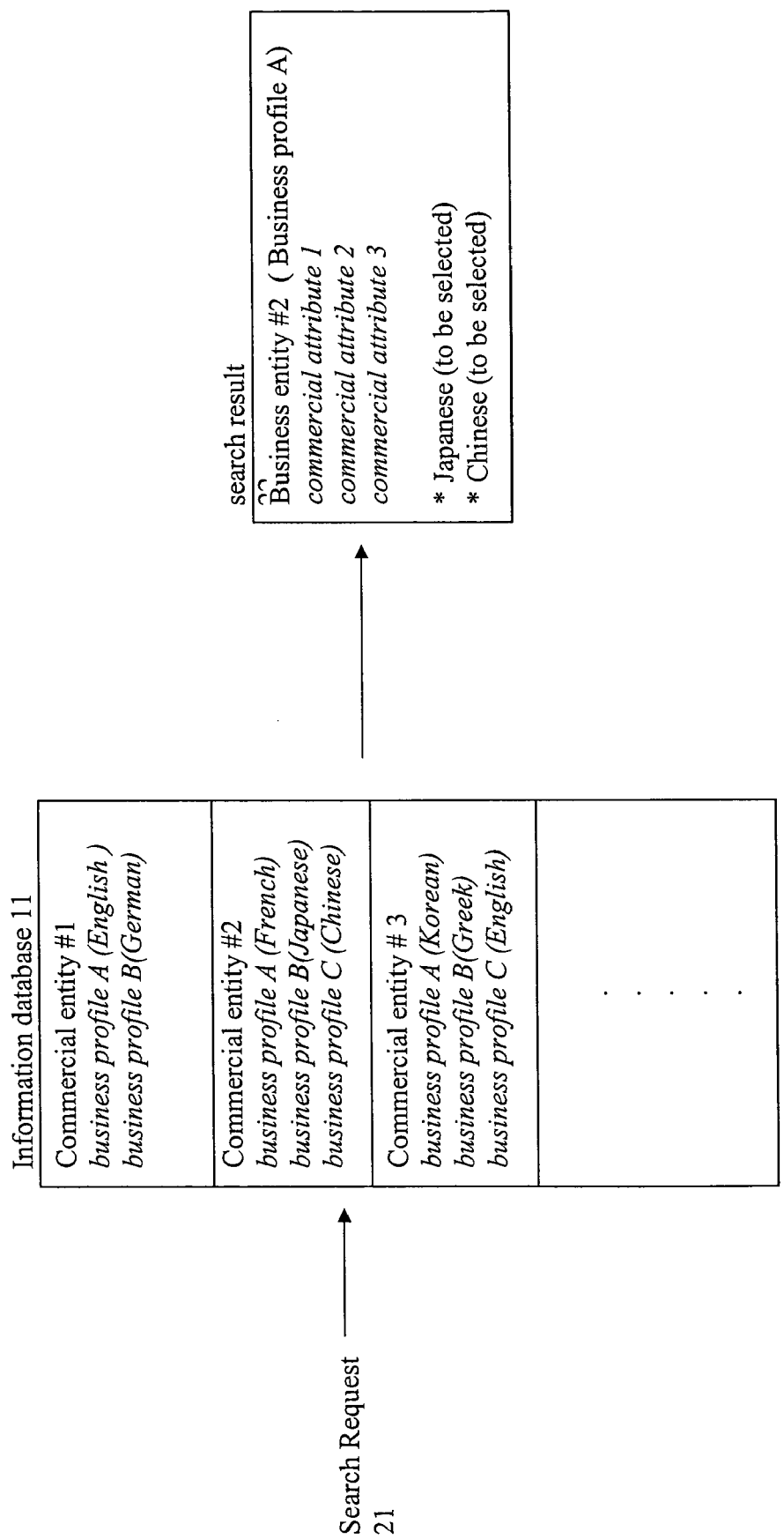
FIG. 2 is a schematic diagram of a search result of the electronic business information system according to the above preferred embodiment of the present invention.

Referring to FIG. 1 to FIG. 2 of the drawings, an electronic business information system according to a preferred embodiment of the present invention is illustrated, in which the electronic business information system comprises an information center 10 and a search platform 20.

The information center 10, which is adapted for a user to access through a public communication network such as the Internet, comprises an information database 11 storing a plurality of business profiles 12 each having an interface subject. The interface subjects of the business profiles 12 are selectively interchangeable and the business profiles 12 are correlated with each other and are characterized by two or more different interface subjects.

The search platform 20 communicatively linking with the information center 10 for the users to search through the information database 11, wherein when the information center 10 receives a search request through the public communication network, the information center 10 selectively sorts out the business profiles 12 matching with the search request to generate a search result containing the business profiles 12 each containing a corresponding business entity displayed in the respective interface subject, such that the business profiles 12 in the search result is adapted to be selectively interchanged the interface subjects of the business profiles 12.

The interface subjects can be any predetermined subjects of information to be displayed in the search result. According to the preferred embodiment of the present invention, the interface subjects are embodied as different interface languages. In addition, each of the business profiles 12 further has a uniform template structure. In other words, the interface languages of the business profiles 12 are selectively interchangeable and the business profiles 12 are correlated with each other and are characterized by two or more different interface languages for two or more different business profiles 12 respectively. Also, the business profiles 12 in the search result 22 are adapted to be selectively compared with the uniform template structure and interchanged the interface languages for corresponding business profiles 12. Accordingly, the electronic information system can be a multilingual business information search engine.

According to the preferred embodiment of the present invention, the search request 21 is sent to the search platform 20 by the user's search engine, which may be embodied as the user's computer, via the public communication network. The information center 10 may actually comprise a plurality of information databases 11 for storing the business profiles 12 which are designed in the uniform templates structure. Consequently, whatever interface language is preferred or utilized, the business profiles 12 will contain the same type of information for a particular business entity. For example, each of the business profiles 12 may contain a product name, a listed price, a selling price, address of the business entity, and possible ranges of services offered, such as online shopping, free shipping etc.

Each of the information databases 11 may contain business profiles 12 written in one particular interface language. Alternatively, the information database 11 can be partitioned into a plurality of sections each characterized by a predetermined interface language so that only business profiles 12 in a corresponding language are allowed to store in that corresponding section of the information database 11.

Referring to FIG. 1 to FIG. 2 of the drawings, the search platform 20 comprises a searching module 23 linked with the information center 10 and the user's search engine to receive the search request 21 and to send the search result 22 back to the search engine via the public communication network. The searching module 23 is preferably embodied as a central processing unit for coordinating and processing information exchange between the information center 10 and the user's search engine.

Moreover, the search platform 20 further comprises an interaction unit 24 linked with the searching module 23 to generate an interactive display for use in the user's search engine. For example, the interaction unit 24 is adapted to generate an interactive website or an interactive display for being access by the user's search engine so as to provide an interactive platform for the user to perform the search of the relevant commercial information by the present invention. It is therefore worth mentioning that the interactive display shows the search results 22 or a search request form for allowing the user to input the subject matter of the search. The search request form and the search results 22 are uniformly designed to form the uniform template structure. In other words, specified information is required both for registering the business entity in the database 11 and the user who wish to perform searches.

The search performed by the present invention is confined to business entities so that irrelevant information is minimized. For example, when one is searching "bicycle", the search results 22 would only contains bicycles providers each of which is presented according to the uniform template structure in a particular interface language so as to minimize redundant information and enhance the efficiency of the search performed by the present invention.

The search platform 20 further comprises a language interchanging link 25 communicating with the business profiles 12 in the information database 11 in such a manner that when the user request interchanging of the interface language, the language interchanging link 25 is adapted to direct the searching module 23 to access the corresponding business profile 12 written in the required interface language for the same subject matter of the search request 21 so as to shift the business profile 12 as displayed to the user from one interface language to another specified interface language. At this point, it is also worth mentioning that the information database 11 and the search platform 20 do not provide translation for the relevant business profile 12. In fact, for a particular business entity, it may register and store more than one business profiles 12 into the information database 11 in such a manner that those business profiles 12 are written in different interface languages, so that the particular business entity can be searched by different interface languages. For example, a particular business entity may be a large multi-national enterprise with different branches in different countries having different native languages (e.g. English in America and German in Germany). Thus, the business entity may register two business profiles 12 wherein one is written in English and the other in German for, substantially, the same information.

As shown in FIG. 3 of the drawings, in order to allow the user to compare the subject matter of his search among different business entities, the search platform 20 further comprises a search comparator 26 communicatively linked with the information database 11 to allow selected attributes of different search results 22 to be juxtaposed for comprehensive comparison. Accordingly, each of the business profiles 12 contains a plurality of commercial attributes 121 displayed according to the uniform templates structure, wherein the user is allowed to select one of the commercial attributes 121 and the selected commercial attribute 121 for different business entities is juxtaposed with each other so as to allow the user to compare that particular commercial attribute 121. For example, the user may wish to compare the selling price of a bicycle, and when he finishes the search, he may request comparing the selling prices of relevant business entities so as to form an optimal purchase decision for particular bicycles. Moreover, it is worth mentioning that the search performed by the present invention is not confined to particular locality while language barrier is eliminated by the interchanging of interface languages, so that the user is able obtain an optimal breadth of information related to the subject matter which is being searched.

Figure 4:
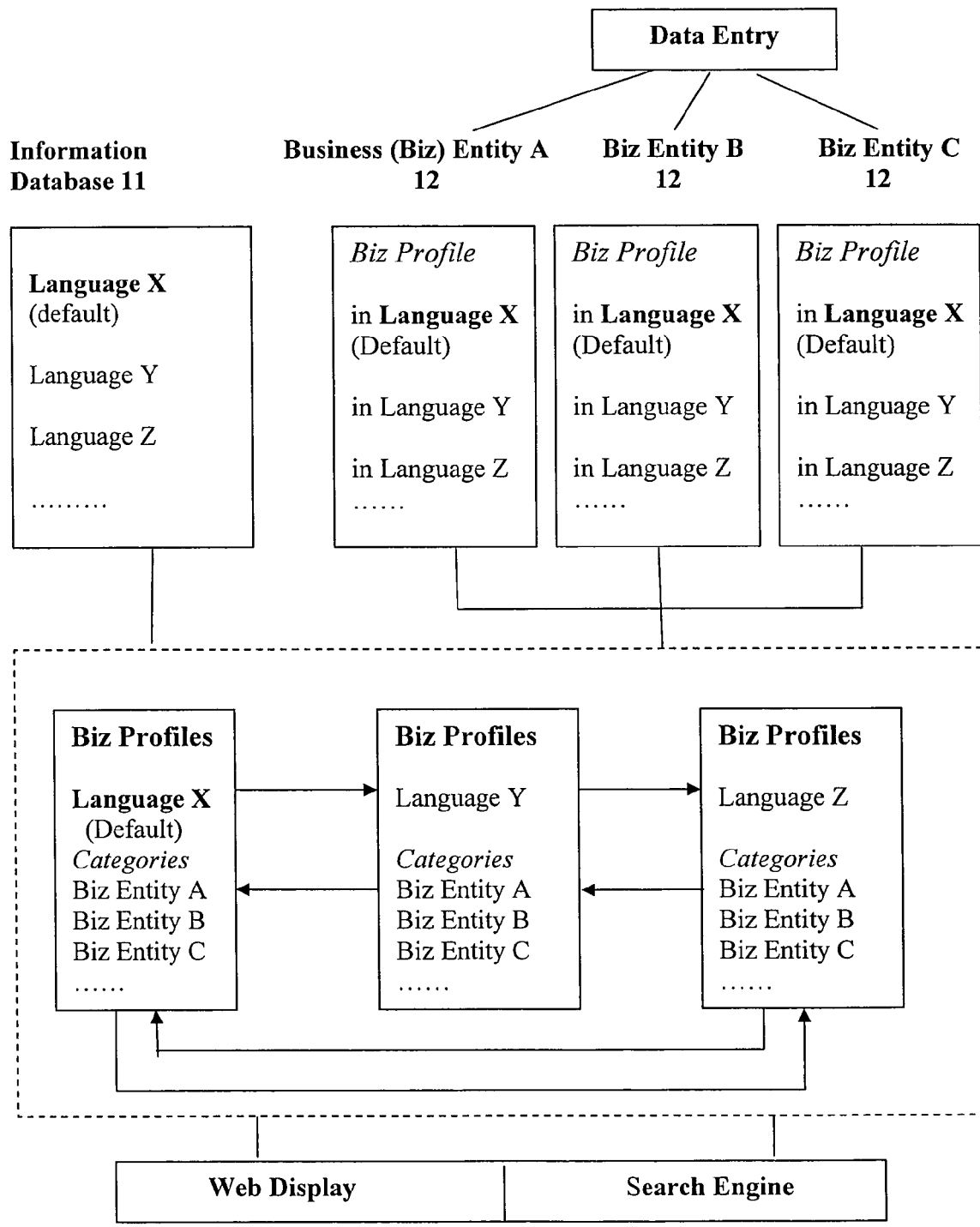
FIG. 4 is a schematic diagram of the information database according to the above preferred embodiment of the present invention.

Referring to FIG. 4 of the drawings, the structure of the information (the business profiles 12) stored in the information database 11 according to the preferred embodiment of the present invention is illustrated. Individual business accounts, such as business entity A, business entity B, and business entity C are given option to enter their respective business profiles 12 in a plurality of languages.

There is a default language determined by a country's official language, such as English. A business entity must specify one default language before other languages can be entered into the information database 11. Ideally, the business profile 12 in all selected languages (e.g. language X to language Z) would be filled up for maximum market exposure. In case that only the business profile 12 in the default language (i.e. language X) is available, the search platform 20 would automatically display the business profile 12 in only the default language X.

To get listed and show up in search results 22 correctly, a business entity must select a right category for its business profiles 12 to be included. Sometimes, multiple categories may be chosen at same time. The categories selected by a business entity would store the nature of the business and other related info (the commercial attributes 121). When someone does a search in language Y or language Z (a language other than the default language), the search engine is adapted to identify those business profiles 12 in language X only based on the categories they are in.

A user may browse the business profile 12 and business listing pages in any interface language out of the stored predetermined interface languages (e.g. interface language X to interface language Z). As shown in FIG. 4 of the drawings, if a user is on the default interface language, the user could switch to other interface languages. After the interface language has been switched, the user may simply browse back to original interface language whenever he or she desires.

For example, assuming that a user has browsed deeply onto an end sub-category page and want to see how other interface language of the search results 22 look like, he or she may simply click on link to another interface language and access the corresponding search result 22 immediately. As a result, the web content is still the same, while only the interface language is changed.

It is worth mentioning that on any interface language from X to language Z, a user could conduct a search by typing a keyword in a different desired language from through search request 21. The system would display the result page in the same language as the current language interface. That language interface can be switched to any other language among interface language X to interface language Z.

For instances, in the search request 21, the user is able to search in, for example, interface language X. However, when the user actually submits the search request 21, he submits it in a mixed interface language, ("auto" in interface language Y and "repair" in interface language Z). The search result 22 would display related the business profiles 12 in interface language X although the user could switch to interface language Y or interface language Z. The search result 22 would be the same as if he or she had done keyword search "auto repair" in language X directly.

Figure 5:
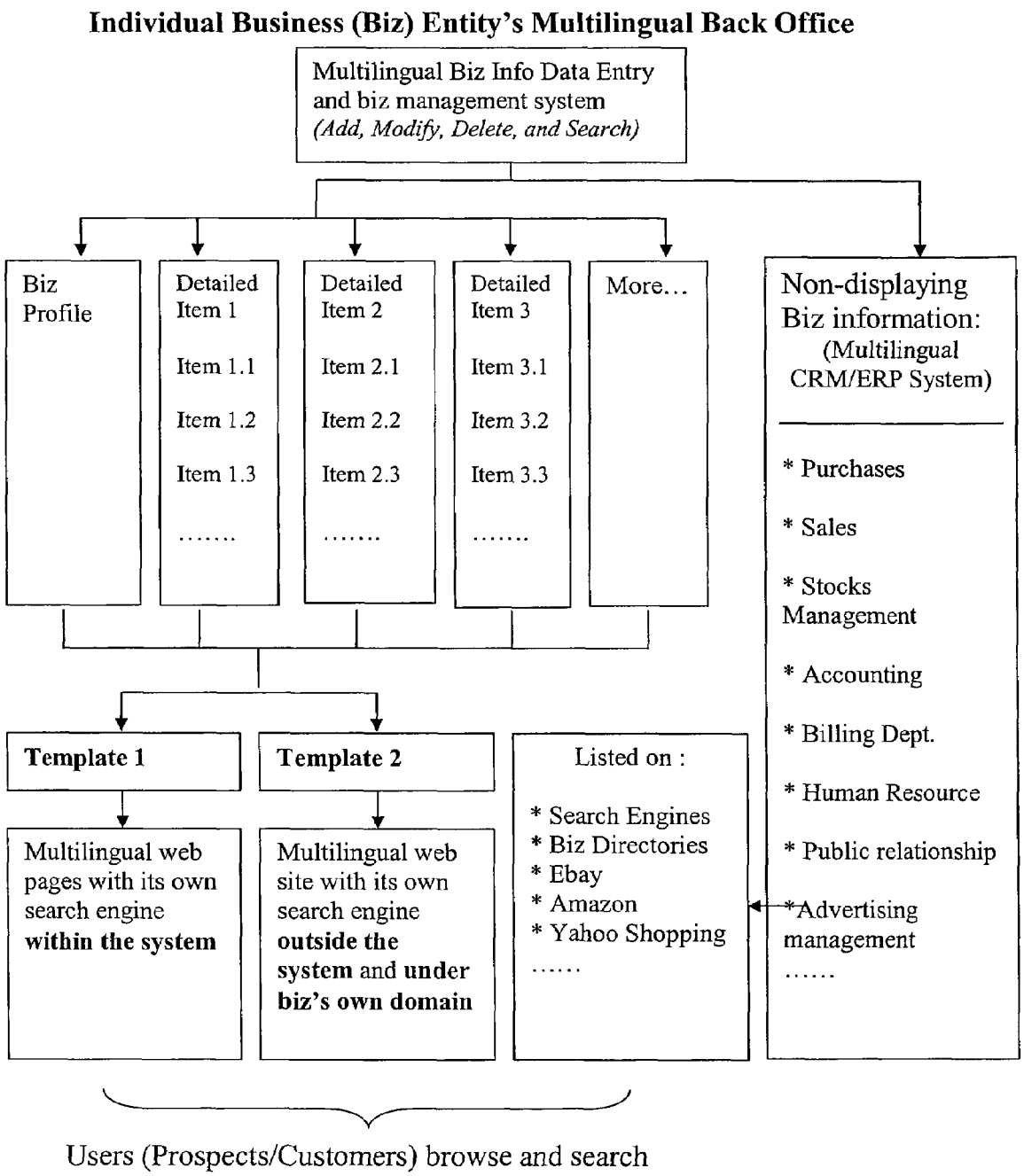
FIG. 5 is a first schematic diagram of the business information as stored in the information database according to the above preferred embodiment of the present invention.

Referring to FIG. 5 of the drawings, an example data structure of each of the business profiles 12 is illustrated. The business entities are capable of inputting detailed item 1 to item 3 or more, in a plurality of interface languages. Those detailed items would be the foundation of in-depth browse and search of the present invention.

Alternatively, all of the business profiles 12 may be categorized by the nature of their business. For example, "Template 1" is for inside business information displayed within search platform 20. For example, auto dealers, real estate agents, and restaurant owner would be given different web templates determined by the nature of each business in order to better display the relevant business information corresponding to the respective business profiles 12.

Each of the listed business entities would have its own multiple web pages under the system domain to display its business profiles 12 in a plurality of interface languages (e.g. interface language X to interface language Z).

Moreover, "Template 2" is for outside business information displaying. In case that a business entity does not have its own domain website, the system could generate web pages under the business entity's own domain. It is an independent multilingual and fully functional website for an individual business entity. It would save the corresponding business entity a lot of time to build such a multilingual interactive website. The business entity may then modify its content conveniently.

As shown in FIG. 5 of the drawings, each of the business entities may store non-publicly accessible information in the information database 11 as part of their corresponding business profiles 12. This is a business management system whose functions include CRM (customer relation management) and ERP (enterprise resource planning). Again, they are available in multi interface languages.

Figure 6:
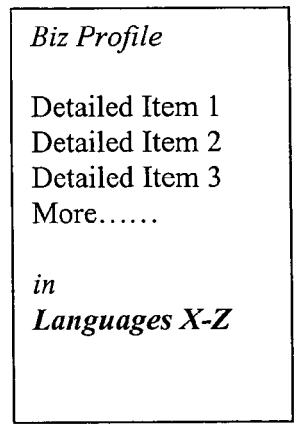
FIG. 6 is a second schematic diagram of the of the business information as stored in the information database according to the above preferred embodiment of the present invention.
Figure 6:
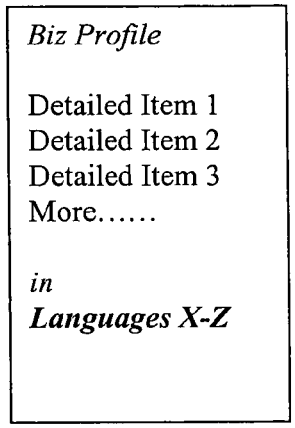
Figure 6:
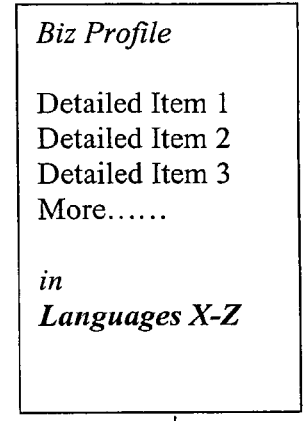
Figure 6:
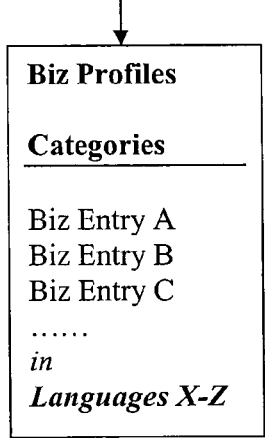
Figure 6:
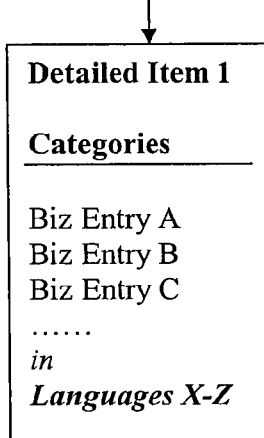
Figure 6:
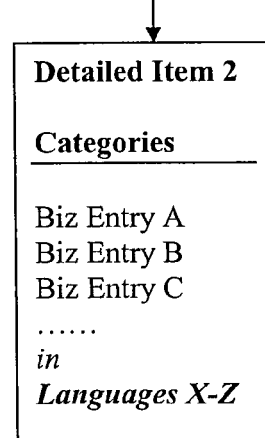
Figure 6:
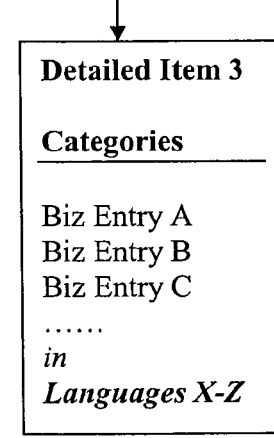
Figure 6:
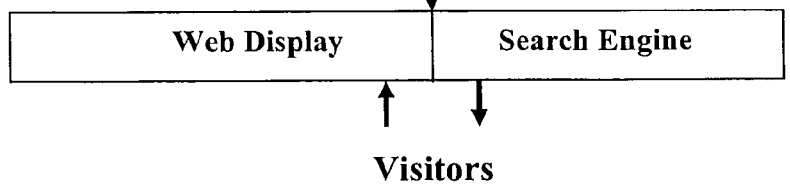

Referring to FIG. 6 of the drawings, each business entity is given the opportunity of not only filling up information as its business profiles 12, but also to enter detailed information about "Item 1", "Item 2" and "Item 3" so as to further provide detailed information in relation to their business information.

Traditionally, a conventional business information system contains only one information channel in one single language, either a business profile channel in the case of yellow pages, local search, or business directories, or one detailed item channel in the case of price comparison websites or shopping directories. Moreover, conventional business information system does not have the function of automatically generating multiple web pages displayed inside the business information system and/or domain websites displayed outside the business information system.

In this multilingual electronic business information system, however, there are multiple information channels written in a plurality interface languages. In other words, it provides multilingual in-depth business information which can be searched in different ways and also automatically generates web pages and/or web sites for small and middle-sized businesses corresponding to the respective business profiles 12.

Now a user has a number of ways to search detailed in-depth business information in a plurality of desired interface languages. He or she may browse business profiles 12 categories or do a keyword-search directly to find an interested business entity, and then click into that business entity's web pages for further information. Or, he or she may browse detailed item categories or does a keyword-search on a detailed item directly. And in this case, he or she would see detailed item information first and then the business profiles 12.

Figure 7:
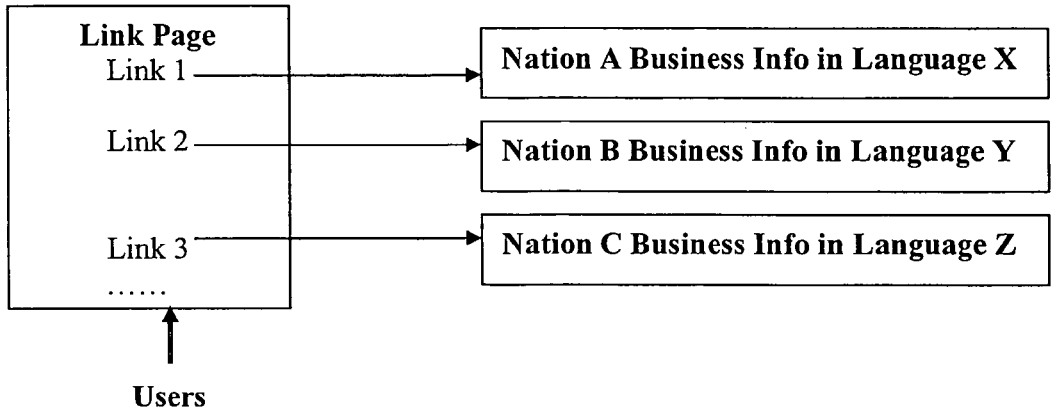
FIG. 7 is a third schematic diagram of the of the business information as stored in the information database according to the above preferred embodiment of the present invention.
Figure 7:
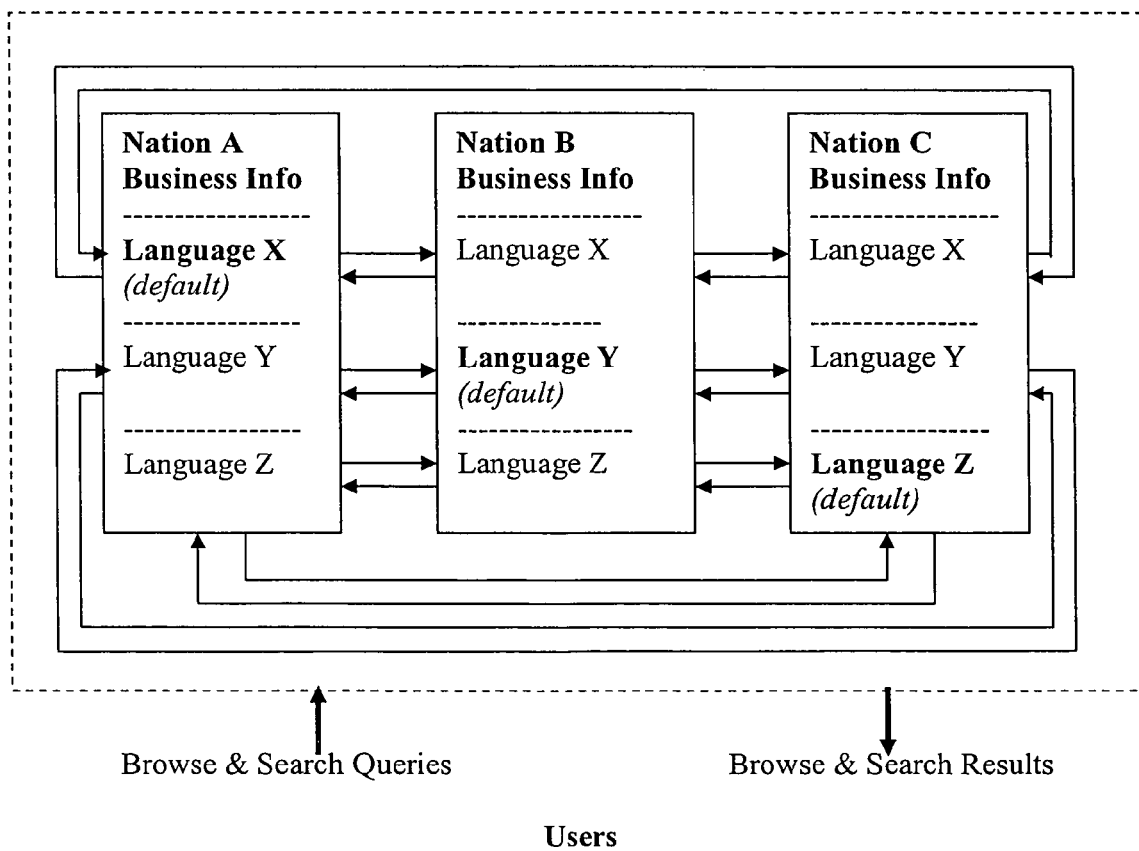

Referring FIG. 7 of the drawings, the present invention is linked into a plurality of countries so to form an integrated and uniformed multilingual international electronic business information system. Generally speaking, there is no relationship among different countries' business information systems, and the only connection is the main link page. Different nations' business information systems are not only in different languages, but also on different web interfaces and site structures.

As a result, a user who speaks a particular interface language (e.g. interface language Z) cannot understand of other nations' business information in other interface languages. The internationally integrated and uniformed multilingual business information system solves all or at least most troubles above. As shown in FIG. 7, all nations' business information is displayed in multiple interface languages (e.g. langrage X to language Z) and also on the same web interface and structure. All countries' business information is now linked with each other.

For instance, the interface language of Nation A is connected to the same interface language of Nation B and Nation C. And the same is true for the interface language X and interface language Z of Nation A. So when one switches to other countries' information from a country's business information, one always stays on the same interface language after the change of the country's business information. One can browse and search other nations' business information in his own language (the desired interface language) instead of the language one does not understand.

For example: a native Englishman would visit China for business or personal purpose, and she did a keyword search of "international yellow pages" on Google search engine. The search result 22 showed her some websites with links to multiple nations' online yellow pages. She got exited at beginning when she saw a China yellow page website called chinabig.com listed there, but became disappointed immediately after she got into chinabig.com because it is written in Chinese and she does not know Chinese at all. The present invention substantially resolves this problem by providing her an English version of the relevant information.

It is important to point out that the electronic business information system as mentioned above is not limited to multilingual application and can be extended to utilize for interchanging of business entities contained in the business profiles 12.

Thus, for the information center 10, each of the business profiles 12 has a uniform template structure and a business entity, wherein the business entities of the business profiles 12 are selectively interchangeable when the business profiles 12 are correlated with each other and are characterized by two or more different business entities. The search platform 20 communicatively links with the information center 10 for the user to search through the information database 11, wherein when a search request 21 is sent to the information center 10 through the public communication network, the information center 10 selectively sorts out the business profiles 12 matching with the search request 21 to generate a search result 22 containing the business profiles 12 having a corresponding business entity, such that the business profiles 12 in the search result 22 is adapted to be selectively compared with the uniform template structure and interchanged the business entities for the corresponding business profiles 12.

As a result, the search platform 20 further comprises an entity interchanging link 27 communicating with the business profiles 12 in the information database 11 in such a manner that when interchanging of the business entity is required, the entity interchanging link 27 is adapted to direct the searching module 23 to access the corresponding business profile 12 containing a corresponding business entity so as to shift the business profile 12 from one business entity to the required business entity.

Figure 8:
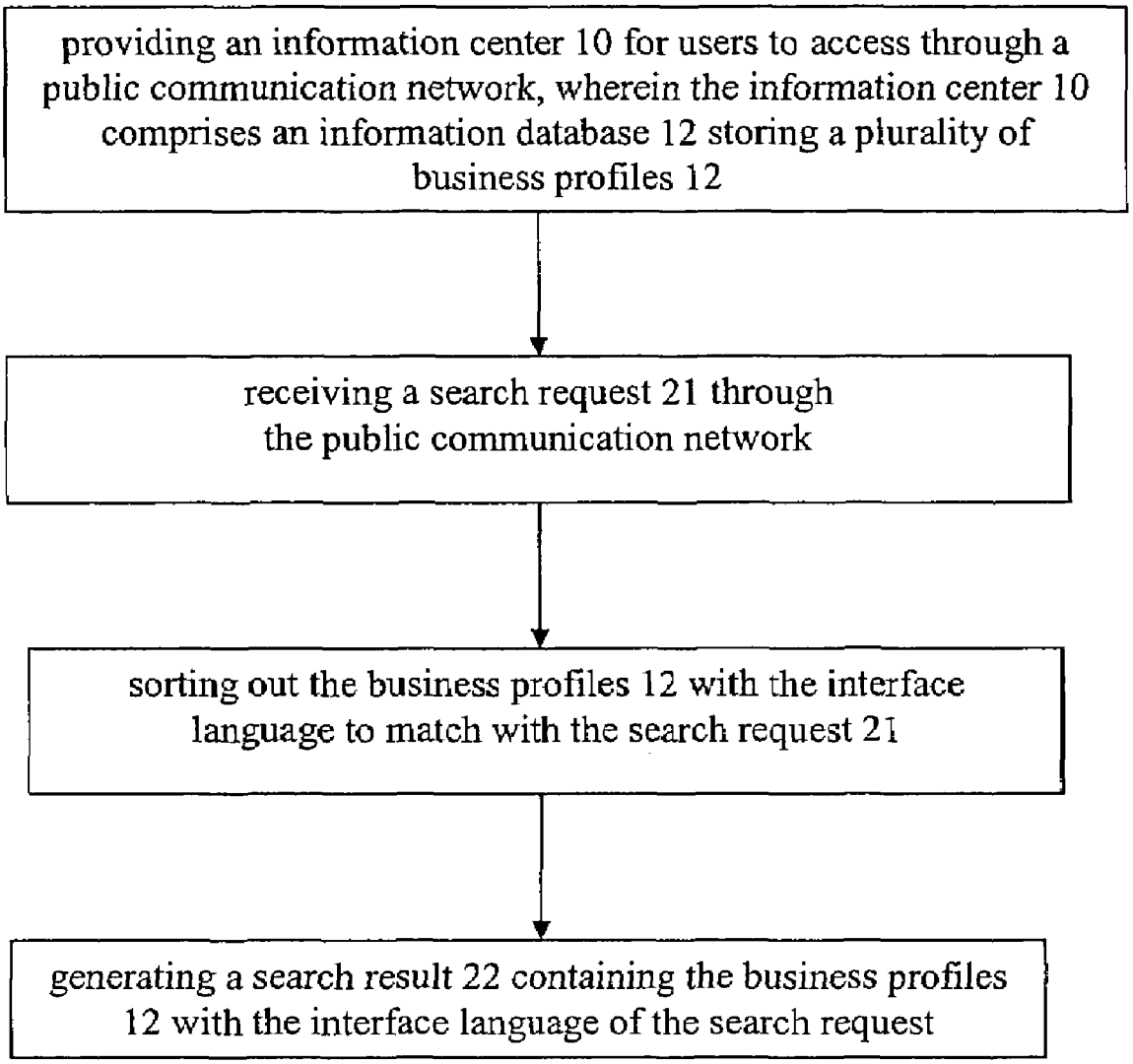
FIG. 8 is a schematic diagram of the method of the multi-lingual business information system according to the above preferred embodiment of the present invention.

Referring to FIG. 8 of the drawings, a method of searching business information according to the preferred embodiment of the present invention is illustrated, in which the method comprises the steps of:

(a) providing the information center 10 for a user to access through a public communication network, wherein the information center 10 comprises an information database 11 storing a plurality of business profiles 12 each having an interface subject, wherein when the business profiles 12 are correlated with each other, the interface subjects of the business profiles 12 are selectively interchangeable;

(b) receiving a search request 21 through the public communication network;

(c) sorting out the business profiles 12 with the interface language to match with the search request 21; and (d) generating a search result 22 containing one or more of the business profiles 12 with the interface subject of the search request 21, wherein each of the business profiles 12 in the search result 22 contains a business entity and is adapted to be selectively interchanged the interface subjects by interchanging the corresponding business profiles 12.

Accordingly the preferred embodiment, the interface subjects are embodied as different interface languages and each of the business profiles 12 further has a uniform template structure, wherein each of the business profiles 12 in the search result 22 is adapted to be selectively compared with the uniform template structure and interchanged the interface languages by interchanging the corresponding business profiles 12.

In order to perform an effective search corresponding to the interface language of the search request 21, the method further comprises a step, in between step (b) and step (c), of identifying an interface language of the search request 21. When the interface language is identified, the sorting will base on the identified interface language and the search result 22 would be generated in that interface language.

With regards to the above-mentioned language interchanging link 25, step (a) comprises the steps of (a.1) linking the business profiles 12 in different interface languages in relation with a same business entity; and (a.2) optionally associating with the corresponding business profiles 12 in different interface language of the business entity to show in the search result 22. Therefore, the user is prompted to select, if he wishes, other interface languages.

Step (b) comprises the steps of:

(b.1) prompting entry of at least one commercial attribute 121 contained in the uniform template structure in a predetermined interface language; and (b.2) receiving a search request 21 based on the commercial attribute 121 in the predetermined interface language.

Step (c) comprises the steps of:

(c.1) matching the commercial attribute 121 contained in the search request 21 with the commercial attributes 121 contained in the uniform template structure in the business profiles 12 stored in the information database 11; and (c.2) identifying the business entities which have the commercial attribute 121 matching with the search request 21 for forming the search result 22; and (c.3) identifying the business profiles 12 of the matched business entities which are in different interface languages for allowing interchanging of the interface language in the search result 22.

In other words, the business profiles 12 of a particular business entity are first found out, wherein the user is provided with an option to interchange the interface language in the search result 22 so as to allow the user to access the information for the relevant business entity in different interface languages as contained in the information database 11.

As a result, step (d) comprises the steps of:

(d.1) displaying the business profiles 12 of the business entities in a primary interface language which is corresponding to the interface language of the search request 21;

(d.2) apart from the primary interface language, prompting other interface languages which can be selected for displaying the corresponding business profiles 12 of the business entities in step (d.1); and (d.3) when one of the other interface languages is selected, interchanging the primary interface language with the selected interface language for displaying the corresponding business profiles 12 in the selected interface language.

Since the searching method of the present invention is language specific without involving translation, it further comprises the step of registering the business profiles 12 in at least one interface language to store in the information database 11 of the information center 10. If the interface language in which the business profiles 12 is written does not exist in the information database 11, a new section in the information database 11 will be created to store such business profiles 12. On the other hand, the method further comprises a step of periodically updating the information database 11 for keeping up-to-date the business profiles 12. This updating sub-step may be performed by receiving periodic updates from the corresponding business entities from which the business profiles 12 are provided, or by regularly chasing updated information in relation to the business entities from which the corresponding business profiles 12 are provided.

In order to further enhance the application of the present invention, the method of searching further comprises a step of linking each of the business profiles 12 to a website of the corresponding business entity so that the user may gain convenient access to further information of the subject matter of his search.

Furthermore, step (d) further comprises a step of juxtaposing particular commercial attributes 121 for allowing the user to compare information of particular commercial attributes 121 for different business entities.

Figure 9:
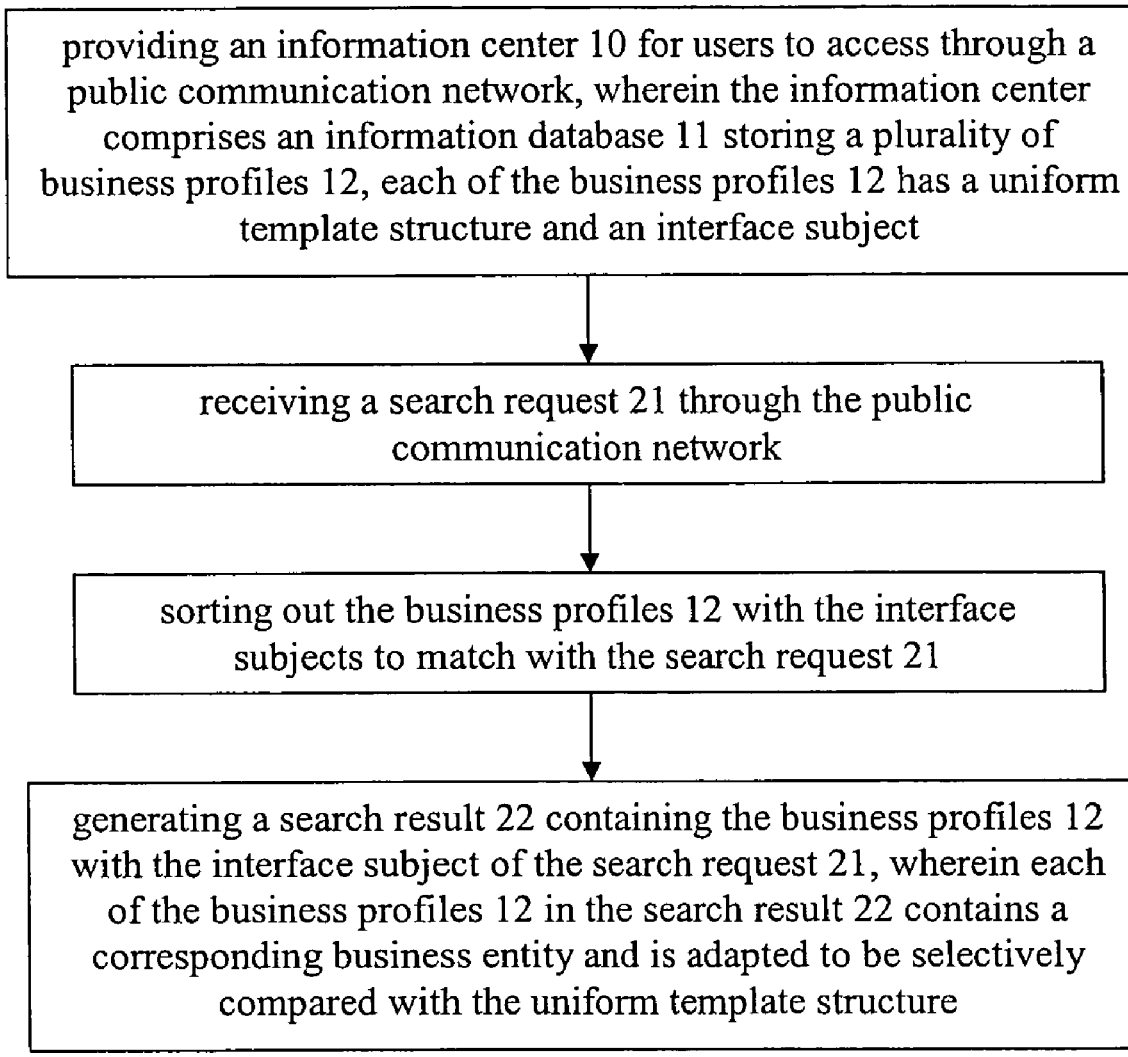
FIG. 9 is a schematic diagram of the method of the electronic business information system according to the above preferred embodiment of the present invention.

As stated above, the interface languages embodied in this embodiment can be other predetermined subjects. As shown in FIG. 9 of the drawings, an alternative mode is illustrated, where the interface subject is embodied as business entity. In other words, the present invention can be utilized for searching business entities in different domains (i.e. international domains) and the search result 22 would allow the user to select business entities in different domains. The method of searching business information then comprises the steps of:

(a) providing an information center 10 for a user to access through a public communication network, wherein the information center comprises an information database 11 storing a plurality of business profiles 12, wherein each of the business profiles 12 has a uniform template structure and an interface entity, wherein when the business profiles 12 are correlated with each other, the interface entities of the business profiles 12 are selectively interchangeable;

(b) receiving a search request 21 through the public communication network;

(c) sorting out the business profiles 12 with the business entities to match with the search request 21; and (d) generating a search result 22 containing the business profiles 12 with the interface entity of the search request 21, wherein each of the business profiles 12 in the search result 22 contains a corresponding interface entity and is adapted to be selectively compared with the uniform template structure and interchanged the interface entity by interchanging the corresponding business profiles 12.

The interface entity may be located in different domains. For example, one interface entity may relate to a Los Angeles branch of a business organization, while another interface entity may relate to a Mexico branch of the same business organization. The present invention allows the user to interchange the interface entity in the corresponding search result 22.

Thus, step (a) comprises the steps of:

(a.1) linking the business profiles 12 in different business entities corresponding to the search request 21; and (a.2) optionally associating with the corresponding business profiles 12 of the corresponding interface entity to show in the search result 22 for allowing interchanging of the interface entities upon selection.

Step (b) comprises the steps of:

(b.1) prompting entry of at least one commercial attribute contained in the uniform template structure for the predetermined interface entity; and (b.2) receiving a search request 21 based on the commercial attribute for the predetermined interface entity.

Similarly, step (c) comprises the steps of:

(c.1) matching the commercial attribute contained in the search request 21 with the commercial attributes contained in the uniform template structure in the business profiles 12 stored in the information database 11; and (c.2) identifying the business entities which have the commercial attribute matching with the search request 21 for forming the search result 22; and (c.3) identifying the business profiles 12 of the matched business entities for allowing interchanging of the business entities in the search result 22.

Step (d) comprises the steps of:

(d.1) displaying the business profiles 12 of the business entities in a primary domain which is corresponding to the search request 21;

(d.2) apart from the primary domain, prompting other domains which can be selected for displaying the corresponding business profiles 12 of the business entities; and (d.3) when one of the other domains is selected, interchanging the interface entity in the primary domain with the interface entity in a selected domain for displaying the corresponding business profiles 12 in that selected domain.

Moreover, step (d) further comprises a step of juxtaposing at least one of the commercial attributes for at least two business entities for allowing a user to compare information of the commercial attribute for the business entities matched with the search request 21.

In order to develop the information database 11 having accurate information, the method further comprises a step before step (a) of registering the business profiles 12 for at least one of the business entities for storing in the information database 11 of the information center 10.

From the forgoing descriptions, the electronic business information system may be utilized for selecting different business entities in different domains for a particular business organization (commercial entity). One particular application of the present invention is selection of different interface languages for a particular business organization. This enables the user to select the optimal interface entity which he or she wants to be displayed. As a result, the present invention is completely suitable for use in international trade or for acting as an optimal platform in facilitating international marketing strategy.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A multilingual electronic business information system, comprising:

an information center, which is adapted to be accessed through a public communication network, and comprises an information database storing a plurality of business profiles, wherein each of said business profiles has a uniform template structure and at least an interface language, wherein said interface languages of said business profiles are selectively interchangeable while said business profiles are correlated with each other, wherein said interface languages of said correlated business profiles are not translated from each other such that said correlated business profiles contain different interface subjects in different interface languages; and a computer generating a search platform communicatively linked with said information center for searching through said information database, so that when said information center receives a search request through said public communication network from said computer, said information center is arranged to selectively sort out at least one of said business profiles matching with said search request to generate a search result containing said corresponding business profile having a corresponding business entity displayed in said respective interface language, wherein each of said business profiles in said search result is adapted to be selectively compared with said uniform template structure, and shift said interface languages for said corresponding business profiles without performing language translation, wherein said search platform comprises a search comparator communicatively linked with said information database to allow selected commercial attributes of said search results to be juxtaposed for comprehensive comparison of said selected attributes in said selected interface language.

2. The system, as recited in claim 1, wherein said search platform comprises a searching module linked with said information center to coordinate and control data transfer between said information center and a search engine so as to receive said search request and send said search result to said search engine via said public communication network.

3. The system, as recited in claim 1, wherein said search platform further comprises an interaction unit communicatively linked with said searching module to generate an interactive display of said search results for use in said search engine.

4. The system, as recited in claim 2, wherein said search platform further comprises an interaction unit communicatively linked with said searching module to generate an interactive display of said search results for use in said search engine.

5. The system, as recited in claim 3, wherein said search platform further comprises a language interchanging link communicating with said business profiles in said information database in such a manner that when interchanging of said interface language is required, said language interchanging link is adapted to direct said searching module to access said corresponding business profile in said required interface language so as to shift said business profile displayed from one interface language to said required interface language.

6. The system, as recited in claim 4, wherein said search platform further comprises a language interchanging link communicating with said business profiles in said information database in such a manner that when interchanging of said interface language is required, said language interchanging link is adapted to direct said searching module to access said corresponding business profile in said required interface language so as to shift said business profile displayed from one of said interface languages to another of said interface languages.

7. A method of searching business information, comprising the steps of:

(a) providing an information center in a computer system adapted to be accessed through a public communication network, wherein said information center comprises an information database storing a plurality of business profiles, wherein each of said business profiles has a uniform template structure and an interface language, wherein when said business profiles are correlated with each other, said interface languages of said business profiles are selectively interchangeable without translation, wherein said interface languages of said correlated business profiles are not translated from each other such that said correlated business profiles contain different interface subjects in different interface languages;

(b) receiving a search request through said public communication network, wherein said search requested is formulated by the steps of (b.1) prompting entry of at least one commercial attribute contained in said uniform template structure in said predetermined interface language and (b.2) receiving a search request based on said commercial attribute in said predetermined interface language;

(c) sorting out said business profiles with said interface language to match with said search request; and (d) generating a search result containing said business profiles with said interface language of said search request, wherein each of said business profiles in said search result contains a corresponding business entity and is arranged to be selectively compared with said uniform template structure and interchange said interface languages by interchanging said corresponding business profiles.

8. The method, as recited in claim 7, wherein the step (a) comprises the steps of:

(a.1) linking said business profiles in said different interface languages in relation with said corresponding business entity; and (a.2) optionally associating with said corresponding business profiles in said different interface languages of said corresponding business entity to show in said search result for allowing interchanging of said interface languages upon selection.

9. The method, as recited in claim 7, wherein said step (c) comprises the steps of:

(c.1) matching said commercial attribute contained in said search request with said commercial attributes contained in said uniform template structure in said business profiles stored in said information database;

(c.2) identifying said business entities which have said commercial attribute matching with said search request for forming said search result; and (c.3) identifying said business profiles of said matched business entities which are in said different interface languages for allowing interchanging of said interface languages in said search result.

10. The method, as recited in claim 8, wherein the step (c) comprises the steps of:
(c.1) matching said commercial attribute contained in said search request with said commercial attributes contained in said uniform template structure in said business profiles stored in said information database;
(c.2) identifying said business entities which have said commercial attribute matching with said search request for forming said search result; and
(c.3) identifying said business profiles of said matched business entities which are in said different interface languages for allowing interchanging of said interface languages in said search result.

11. The method, as recited in claim 7, wherein the step (d) comprises the steps of:
(d.1) displaying said business profiles of said business entities in one of said interface languages as a primary interface language, corresponding to said interface language of said search request;
(d.2) apart from said primary interface language, prompting said other interface languages which are able to be selected for displaying said corresponding business profiles of said business entities; and
(d.3) when one of said other interface languages is selected as a selected interface language, interchanging said primary interface language with said selected interface language for displaying said corresponding business profiles in said selected interface language.

12. The method, as recited in claim 10, wherein the step (d) comprises the steps of:
(d.1) displaying said business profiles of said business entities in one of said interface languages as a primary interface language, corresponding to said interface language of said search request;
(d.2) apart from said primary interface language, prompting said other interface languages which are able to be selected for displaying said corresponding business profiles of said business entities; and
(d.3) when one of said other interface languages is selected as a selected interface language, interchanging said primary interface language with said selected interface language for displaying said corresponding business profiles in said selected interface language.

13. The method, as recited in claim 11, after said step (b) and before said step (c), further comprising a step of identifying one of said interface language as an identified interface language of said search request so as to perform search in said identified interface language.

14. The method, as recited in claim 12, after said step (b) and before said step (c), further comprising a step of identifying one of said interface language as an identified interface language of said search request so as to perform search in said identified interface language.

15. The method, as recited in claim 13, before the step (a), further comprising a step of registering said business profiles in at least one of said interface languages as a registered interface language for storing in said information database of said information center.

16. The method, as recited in claim 14, before the step (a), further comprising a step of registering said business profiles in at least one of said interface languages as a registered interface language for storing in said information database of said information center.

17. The method, as recited in claim 15, wherein said step (d) further comprises a step of juxtaposing at least one of said commercial attributes for at least two business entities for allowing a user to compare information of said commercial attribute for said business entities matched with said search request.

18. The method, as recited in claim 16, wherein said step (d) further comprises a step of juxtaposing at least one of said commercial attributes for at least two business entities for allowing a user to compare information of said commercial attribute for said different business entities matched with said search request.

19. An electronic business information system, comprising:
an information center adapted to be accessed through a public communication network, and comprises an information database storing a plurality of business profiles each having at least an interface subject, wherein said interface subjects of said business profiles are selectively interchangeable while said business profiles are correlated with each other, wherein said interface subject of said correlated business profiles are not translated from each other such that said correlated business profiles contain different interface subjects in different interface languages; and
a computer generating a search platform communicatively linking with said information center for searching through said information database, so that when said information center receives a search request through said public communication network, said information center selectively sorts out said business profiles matching with said search request to generate a search result including said business profiles each containing a corresponding business entity, wherein each of said business profiles in said search result is adapted to be selectively interchanged said interface subjects for said corresponding business profiles, wherein said search platform comprises a search comparator communicatively linked with said information database to allow selected commercial attributes of said search results to be juxtaposed for comprehensive comparison of said selected attributes.

20. The system, as recited in claim 19, wherein said interface subjects are different interface languages.

21. The system, as recited in claim 19, wherein said interface subjects are different interface entities located in different domains.

22. The system, as recited in claim 21, wherein each of said business profiles has a uniform template structure, wherein said business profiles in said search result is adapted to be selectively compared with said uniform template structure.

23. The system, as recited in claim 22, wherein said search platform comprises a searching module linked with said information center to coordinate and control data transfer between said information center and a search engine so as to receive said search request and send said search result to said search engine via said public communication network.

24. The system, as recited in claim 23, wherein said search platform further comprises an interaction unit communicatively linked with said searching module to generate an interactive display of said search results for use in said search engine.

25. The system, as recited in claim 23, wherein said search platform further comprises an interface subject interchanging link communicating with said business profiles in said information database in such a manner that when interchanging of said interface subject is required, said interface subject interchanging link is adapted to direct said searching module to access said corresponding business profile containing said required interface subject so as to shift said business profile from one of said interface subjects to another of said interface subjects.

26. The system, as recited in claim 24, wherein said search platform further comprises an interface subject interchanging link communicating with said business profiles in said information database in such a manner that when interchanging of said interface subject is required, said interface subject interchanging link is adapted to direct said searching module to access said corresponding business profile containing said required interface subject so as to shift said business profile from one of said interface subjects to another of said interface subjects.

27. A method of searching business information, comprising the steps of:
   (a) providing an information center in a computer system for a user to access through a public communication network, wherein said information center comprises an information database storing a plurality of business profiles each having an interface subject, wherein said business profiles are correlated with each other and said interface subjects of said business profiles are selectively interchangeable with each other;
   (b) receiving a search request through said public communication network, wherein said search requested is formulated by the steps of (b.1) prompting entry of at least one commercial attribute contained in said uniform template structure for said predetermined business entity; and (b.2) receiving a search request based on said commercial attribute for said predetermined business entity;
   (c) sorting out said business profiles with said business entities to match with said search request; and
   (d) generating a search result containing said business profiles with said business entity of said search request, wherein each of said business profiles in said search result contains at least a corresponding business entity and is adapted to be selectively interchange said interface subject by interchanging said corresponding business profiles, wherein said interface subject of said correlated business profiles are not translated from each other such that said correlated business profiles contain different interface subjects in different interface language, wherein said commercial attributes of said business entities are juxtaposed for allowing a user to compare information of said commercial attribute for said business entities matched with said search request.

28. The method, as recited in claim 27, wherein said interface subjects are different interface languages.

29. The method, as recited in claim 27, wherein said interface subjects are different interface entities located in different domains.

30. The method, as recited in claim 29, wherein each of said business profiles has a uniform template structure, wherein said business profiles in said search result is adapted to be selectively compared with said uniform template structure.

31. The method, as recited in claim 27, wherein the step (a) comprises the steps of:
   (a.1) linking said business profiles in said interface subjects corresponding to said search request; and
   (a.2) optionally associating with said corresponding business profiles of said corresponding interface subject to show in said search result for allowing interchanging of said interface subjects upon selection.

32. The method, as recited in claim 31, wherein said step (c) comprises the steps of:
   (c.1) matching said commercial attribute contained in said search request with said commercial attributes contained in said uniform template structure in said business profiles stored in said information database; and
   (c.2) identifying said interface subjects which have said commercial attribute matching with said search request for forming said search result; and (c.3) identifying said business profiles of said matched interface subjects for allowing interchanging of said interface subjects in said search result.

33. The method, as recited in claim 32, wherein the step (d) comprises the steps of:
   (d.1) displaying said business profiles of said business entities in one of said interface subject as a primary interface subject corresponding to said search request;
   (d.2) apart from said primary interface subject, prompting other said interface subject which is able to be selected for displaying said corresponding business profiles of said business entities; and
   (d.3) when one of said other interface subjects is selected as a selected interface subject, interchanging said primary interface subject with said selected interface subject for displaying said corresponding business profiles with said selected interface subject.

34. The method, as recited in claim 33, before said step (a), further comprising a step of registering said business profiles for at least one of said interface subjects for storing in said information database of said information center.

* * * * *